United States Patent
Maruta et al.

[15] 3,660,070
[45] May 2, 1972

[54] PROCESS OF PREVENTING AGGLOMERATION OF FERTILIZERS

[72] Inventors: Iwao Maruta; Haruhiko Arai; Moriyasu Murata, all of Chiba, Japan

[73] Assignee: Kao Soap Co., Ltd., Tokyo, Japan

[22] Filed: Apr. 30, 1970

[21] Appl. No.: 33,520

[30] Foreign Application Priority Data

Jan. 20, 1970 Japan..................................45/5555

[52] U.S. Cl..........................71/64 E, 71/28, 71/30, 71/59, 117/100 A, 117/100 B, 252/381
[51] Int. Cl..........................................C05g 3/00
[58] Field of Search..............71/64, 64 E, 28, 59; 117/100 A, 100 B; 252/381

[56] References Cited

UNITED STATES PATENTS 3,230,038  1/1966  Wilson .................................71/64 E
3,169,053  2/1965  Sawyer.................................71/64 E

FOREIGN PATENTS OR APPLICATIONS 1,109,665  4/1968  Great Britain

*Primary Examiner*—S. Leon Bashore
*Assistant Examiner*—Frederick Frei
*Attorney*—Woodhams, Blanchard and Flynn

[57] ABSTRACT

A granular fertilizer is treated with an anti-caking agent consisting of an aqueous solution of (1) a substantially water-insoluble polymer of polyvinyl acetate, polyvinyl acetals, partially saponified polyvinyl acetate, partially acetylated polyvinyl alcohol, esters of polyacrylic acid and an aliphatic alcohol, or copolymers thereof with another copolymerizable monomer, dissolved in (2) an aqueous solution of alkyl sulfates, α-olefin sulfonates or alkylsulfonates containing six to 10 carbon atoms or alkylbenzenesulfonates in which the alkyl radical contains four to eight carbon atoms. The treated fertilizer product can be packed in polyethylene bags without causing tearing or the bags during storage.

3 Claims, No Drawings

PROCESS OF PREVENTING AGGLOMERATION OF FERTILIZERS

This invention relates to a process for the prevention of caking or agglomeration of fertilizers apt to cake, specifically urea, ammonium sulfate, ammonium nitrate, ammonium phosphate, ammonium chloride and mixtures thereof.

The present invention is especially effective for treating urea and ammonium sulfate.

Surface active agents have extensively been used as anti-caking agents for fertilizers apt to cake, such as those above mentioned, and there are many literature disclosures and patents thereon. Further, one of us, Maruta, discovered lately that a water-solubilized high polymer, obtained by dissolving in a concentrated aqueous solution of an anionic surface active agent a substantially water-insoluble vinyl series high polymer (which will be hereinafter referred to merely as "water-solubilized high polymer"), has an excellent anti-caking effect on urea and other fertilizers apt to cake.

Hitherto, fertilizers treated with these anti-caking agents have been marketed in packages, such as paper bags, jute bags, polyvinyl chloride bags or the like. Recently, however, with the improvements of packaging and the progress of the petrochemical industry, bags formed of an ethylene-vinyl acetate copolymer, usually of a vinyl acetate content of less than 10 percent which is available very advantageously in respect of price (which will be hereinafter referred to as "polyethylene bag") have begun to be used.

However, in case a fertilizer which has been treated with a conventional surface active agent or a solution of water-solubilized high polymer as an anti-caking agent is packed in polyethylene bags and the filled polyethylene bags are piled up, the bags are apt to tear along the seal or weld line causing various troubles, so that there is a demand for the development of an anti-caking agent which will not cause the bags quickly to get torn.

As the results of a thorough investigation of the cause of the break-down of polyethylene bags, we have found that a decrease in the extensibility of the polyethylene bag caused by the action of the surface active agent and an increase in the flowability of the fertilizer caused by the anti-caking agent treatment result in an increase of the internal pressure imposed on the bag and such increase of the internal pressure causes the break-down of the bag. It is necessary, in order to avoid the break-down of the bag, to reduce the amount of the surface active agent used as an anti-caking agent for the fertilizer to several ppm or less. However, it is impossible to obtain a sufficient anti-caking effect by the treatment with such a small amount of an anti-caking agent.

Accordingly, it is an object of the present invention to provide an excellent anti-caking agent and anti-caking process which will not cause the break-down of the polyethylene bags. Other objects and advantages of the present invention will be made clear to persons having an ordinary knowledge in this technical field in the following disclosure and explanation.

The anti-caking agent of the present invention is a solution system obtained by solubilizing or dissolving a substantially water-insoluble synthetic high polymer compound in a concentrated solution of a compound selected from the group consisting of (1) alkylsulfates, $\alpha$-olefinsulfonates and alkylsulfonates containing 6 to 10 carbon atoms in the molecule and (2) alkylbenzene-sulfonates having an alkyl radical containing four to eight carbon atoms. These solubilizing agents will be hereinafter referred to as "middle alkylsulfate etc."

The middle $\alpha$-olefinsulfonates of $C_{6-10}$ to be used in the present invention can be obtained by reacting an $\alpha$-olefin containing six to 10 carbon atoms with a sulfonating or sulfating agent and neutralizing the reaction product with an alkali and, although there are obtained various isomers depending on the reaction conditions, an $\alpha$-olefinsulfonate prepared in the standard manufacturing process consists of about 20 to 60 percent by weight of an alkenylsulfonate (hereinafter referred to as "alkenyl isomer") and about 40 to 80 percent by weight of a hydroxyalkylsulfonate (hereinafter referred to as "hydroxyl isomer"). The alkenyl isomer consists mainly of 2,3-unsaturated isomer and 3,4-unsaturated isomer and contains a small amount of more inner unsaturated isomers. The hydroxyl isomer consists mainly of 3-hydroxyl isomer and contains a small amount of other isomers. The middle $\alpha$-olefinsulfonates to be used in the present invention may contain any one or more of the above isomers.

The above middle alkylsulfate etc. are used as the solubilizing agent in the form of a sodium, potassium, lithium or other alkali metal salt or calcium, magnesium, strontium or other alkaline earth metal salt.

These solubilizing agents have an alkyl chain which is shorter than the alkyl chains in the well-known and extensively used surface active agents and have not been generally utilized as surface active agents.

The term "surface active agent" is a general term for such substances that contain a hydrophilic radical and a lipophilic radical and have a surface activating action. This term includes a considerably wide scope of compounds. Accordingly, if alkylsulfates are taken as an example, the alkylsulfates containing six to 10 carbon atoms to be used in the present invention might be, for form's sake, included in the surface active agent. However, according to the classification based on actual use, alkylsulfates which can be correctly termed "surface active agent" are limited to those having an alkyl group containing 12 to 18 carbon atoms. Those containing 10 or less carbon atoms are very inferior in surface activity. For instance, the critical micell concentration at 25° C. required for exhibiting a surface activity is 0.24 percent by weight for 12 carbon atoms, 0.78 percent by weight for 10 carbon atoms and 3.0 percent by weight for 8 carbon atoms, it being very high for alkylsulfates containing 10 or less carbon atoms. Moreover, from the industrial point of view alkyl sulfates containing 10 or less carbon atoms are not being manufactured commercially and the starting alcohols for preparing them are being used only as a raw material for the manufacture of plasticizers.

The water-insoluble synthetic high polymer to be used in the present invention includes polyvinyl acetate, acetalized products of polyvinyl alcohol with an aliphatic aldehyde containing one to four carbon atoms, water-insoluble partial hydrolyzates of polyvinyl acetate (including water-insoluble partial acetylated products of polyvinyl alcohol), esters of polyacrylic acid with an aliphatic alcohol containing one to four carbon atoms and copolymers of such a polymer or copolymer with another copolymerizable monomer.

Specific examples of the water-insoluble synthetic high polymers to be used in the present invention are: polyvinyl acetate, polyvinyl formal, polyvinyl acetoacetal, polyvinyl butyral, water-insoluble partial saponification products of polyvinyl acetate, substantially water-insoluble partial acetylated products of polyvinyl alcohol, graft copolymers of polyvinyl alcohol and vinyl acetate, copolymers of vinyl acetate with vinylpyrrolidone, copolymers of vinyl acetate with maleic anhydride, methyl-, ethyl-, propyl- and butyl esters of polyacrylic acid, copolymers of ethyl acrylate with 2-ethylhexyl acrylate, copolymers of vinyl acetate with ethylene and copolymers of vinyl acetate with methyl-, ethyl-, propyl- or butyl acrylate.

The polyvinyl alcohol used as a starting material for making the polyvinyl acetals is not necessarily pure polyvinyl alcohol, may contain residual acetyl or other acetyl groups in the molecule and it may be hydrolyzed products of copolymers of vinyl acetate with another polymerizable monomer such as, e.g., vinyl-pyrrolidone, maleic anhydride or acrylate ester.

The water-insoluble high polymer should be of a polymerization degree within the range in which the high polymer is soluble in a concentrated solution of a solubilizing agent as mentioned above, preferably of at least 10 and more desirably of a polymerization degree within the range from 100 to 3,000.

Any suitable combination of a solubilizing agent comprising the above middle alkylsulfate etc. and a water-insoluble high polymer selected from the classes as mentioned above can be conveniently used. The weight ratio of the solubilizing agent to the high polymer may be varied in a wide range. The optimum ratio for attaining an excellent result varies remarkably depending on the kinds, molecular weight and synthesis process of the high polymer used and the nature and purity of the solubilizing agent used, but, in general, the weight ratio of the solubilizing agent to the high polymer ranges between from 1:9 to 9:1. Although it is of course possible to solubilize a high polymer by using a further large amount of a solubilizing agent, the anti-caking effect obtained will become poor and not so different from the anti-caking effect obtained by the use of the solubilizing agent alone, when the ratio is above 9:1. On the other hand, if the ratio is below 1:9, the water-insoluble high polymer will not be generally solubilized and, in case it can be solubilized, the high polymer compound solubilized will be too hydrophilic to give a sufficient anti-caking effect.

Although various methods can be adopted in order to solubilize a water-insoluble high molecular compound as mentioned above by means of a solubilizing agent as mentioned above, the solubilization will be usually carried out by adding a predetermined amount of a high polymer compound in the form of granules or of an emulsion to an aqueous concentrated solution of a solubilizing agent usually of a concentration of 10 to 30 percent by weight and stirring the resulting mixture at a room temperature or if desired at an elevated temperature.

The anti-caking agent in accordance with the present invention may be added to a fertilizer by any available means similar to the means adopted in the application of conventional anti-caking agents. For example, the anti-caking agent can be added to a slurry of a fertilizer or a solution of the anti-caking agent can be sprayed on the surface of a fertilizer in the form of powder, crystal or granule. In the latter case, it is preferred for the enhancement of the spraying efficiency to spray the solution on the fertilizer by means of a jet spray while the fertilizer is being conveyed by a conveyor belt or is falling in stream from a conveyor.

Although the anti-caking agent in accordance with the present invention is obtained usually as a concentrated aqueous solution, it is preferred, in view of the convenience of working, to dilute it to a concentration of 0.1 to 10, preferably 1 to 5 percent by weight prior to the addition thereof to a fertilizer to be treated.

The anti-caking agent of the present invention will be usually added in the total amount of the high polymer compound and the solubilizing agent of 0.005 to 0.5 percent by weight of the fertilizer to be treated.

The present invention shall now be explained with reference to examples.

EXAMPLE 1

A 20% aqueous solution of the respective anti-caking agent in the amount corresponding to 0.05 percent by weight of powdered urea was diluted to a concentration of 3 percent by weight and uniformly sprayed on 200g. of urea. The urea was then dried to a moisture content of about 0.06 percent by weight and pulverized to 20 to 60 Tyler mesh. 30g. of the urea so treated and pulverized was pressed under a load of 100Kg/cm$^2$ for 3 minutes in a tablet molding press of a diameter of about 5cm to obtain a tablet as a test piece for a caking test.

The degree of caking was determined by using a specially made breaking device, imposing pressure to the test piece and measuring a load required for the break of the test piece. The smaller the load at the break the lower the degree of caking. The test results were shown in the Table 1.

TABLE 1.—ANTI-CAKING EFFECT ON UREA

| | Kinds of anti-caking agents | | Load at break (kg.) |
|---|---|---|---|
| | Compounds used | Ratios of compounds | |
| Examples for comparison. | None | | 19.0 |
| | Sodium octylsulfate | | 15.0 |
| | PVAc/sodium dodecylbenzenesulfonate | 1/4 | 6.7 |
| | PVAc/sodium dodecylbenzenesulfate | 3/7 | 7.9 |
| Examples of the present invention. | PVAc/sodium octylsulfate | 3/7 | 4.9 |
| | PVAc/sodium hexylsulfate | 3/7 | 6.1 |
| | PVAc/sodium hexylbenzenesulfonate | 1/4 | 7.0 |
| | PVAc/sodium α-olefin (ave. C$_8$) sulfonate | 1/4 | 6.3 |
| | PVAc/sodium octylsulfonate | 1/5 | 7.8 |
| | PVB/potassium octylsulfate | 1/4 | 7.0 |
| | PVAcl/potassium octylsulfate | 1/1 | 6.5 |
| | PVF/potassium octylsulfate | 1/5 | 8.0 |
| | Ac-PVA/potassium octylsulfate | 3/7 | 8.1 |
| | EVA/potassium octylsulfate | 1/3 | 6.0 |

Note:
The abbreviations used in the Table are as follows:
PVAc: Polyvinyl acetate (in the form of emulsion) of a polymerization degree of 500.
PVB: Polyvinyl butyral of a polymerization degree of 1,100 and a butyralization degree of 62 percent.
PVAcl: Polyvinyl acetoacetal of a polymerization degree of 1,100 and an acetalization degree of 32 percent.
PVF: Polyvinyl formal of a polymerization degree of 900 and a formalization degree of 87 percent.
Ac-PVA: Partially acetylated polyvinyl alcohol of a polymerization degree of 1,100 and an acetylation degree of 66 percent.
EVA: Ethylene-vinyl acetate 1:1 copolymer of a polymerization degree of 2,000.

The above table indicates that the anti-caking agent of the present invention has an excellent anti-caking effect which is comparable with or superior to that of the water-solubilized high polymer solutions shown in the above examples for comparison.

EXAMPLE 2

A 20 percent by weight solution of a solubilizing agent containing dissolved therein in the amount corresponding to the weight ratio of the solubilizing agent to the polymer polyvinyl acetate (referred to as "PVAc") of a polymerization degree of 500 was diluted to a concentration of solubilizing agent of 1 percent by weight and uniformly sprayed on ammonium sulfate. The ammonium sulfate was then dried to a moisture content of 0.01 percent and pulverized to 20 to 60 Tyler mesh. 30g. of the pulverized ammonium sulfate was molded into a tablet and a load required for breaking the tablet was determined in the same manner as in Example 1. The results were as shown in the Table 2.

TABLE 2.—ANTI-CAKING EFFECT ON AMMONIUM SULFATE

| | Anti-caking agent | | |
|---|---|---|---|
| | Compounds used | Amount added (percent by weight) | Load at break (kg.) |
| Examples for comparison. | None | | 10.1 |
| | Sodium dodecylsulfate | 0.05 | 2.1 |
| | PVAc/sodium dodecylbenzenesulfonate* | 0.05 | 0.9 |
| Examples of the present invention. | PVAc/sodium octylsulfate | 0.01 | 0.9 |
| | PVAc/sodium octylsulfate | 0.05 | 0.8 |
| | PVAc/sodium octylsulfate | 0.1 | 0.6 |

* The ratio by weight of PVAc to sodium dodecylbenzenesulfonate was made 1 to 4.

The anti-caking agent of the present invention has, as indicated by the above table, an excellent effect also on ammonium sulfate.

EXAMPLE 3

Test pieces of a width of 1.0cm and a length of 10cm having a heat seal in the center thereof were cut out of various kinds of polyethylene bags for packing urea and the test pieces were soaked in an 1 percent by weight aqueous solution of an anti-caking agent at 25° C. with a weight of 150g. fixed to the lower end of each test piece, the assemblies being put in air for 7 days.

Thereafter, the test pieces were subjected to the determination of tensile strength and of extensibility by means of a Schopper tensile tester made by Toyo Tester Co. The extensibility was calculated by the following equation Extensibility = (Length at break − Initial length/Initial length)

The results were as shown in Table 3.

TABLE 3

Average extensibilities and average tensile strengths after immersion of test pieces of various polyethylene bags in 1 percent by weight aqueous solutions of various anti-caking agents for 7 days.

| | Kinds of anti-caking agents | | Kinds of test piece | Extensibility | Tensile strength (kg./cm.²) |
|---|---|---|---|---|---|
| | Compounds used | Ratio of compounds | | | |
| Examples for comparison. | None (put in air) | | | 2.9 | 2.2 |
| | None (soaked in water at 25° C.) | | | 2.9 | 2.2 |
| | Sodium dodecylsulfate | | A | 0.8 | 2.0 |
| | PVAc/sodium dodecylbenzenesulfonate | ¼ | A | 0.2 | 1.2 |
| Examples of the present invention. | PVAc/sodium octylsulfate | ¾ | A | 2.9 | 2.2 |
| | PVAc/sodium hexylsulfate | ¾ | A | 2.9 | 2.2 |
| | PVAc/sodium hexylbenzenesulfonate | ¼ | B | 2.0 | 2.1 |
| | PVAc/sodium α-octenesulfonate | ¼ | A | 2.9 | 2.2 |
| | PVAc/sodium octylsulfonate | ⅕ | A | 2.9 | 2.2 |

Note:
PVAc: Polyvinyl acetate of a polymerization of 500.
Test piece A: Ethylene-vinyl acetate 95:5 copolymer of a melt index of 0.1 − 0.5, thickness 0.22mm, heat seal temperature 200° C.
Test piece B: Ethylene-vinyl acetate 90:10 copolymer of a melt index of 3, thickness 0.22mm, heat seal temperature 200° C.

EXAMPLE 4

To urea was added 0.03 percent by weight of the respective anti-caking agent, as listed in the Table 3, in the form of an 1 percent by weight aqueous solution. The urea thus treated was packed in polyethylene bags formed of the same material as the test piece A in Example 3 and 20 bags filled with the treated urea were heaped up. In cases of the bags filled up with a urea treated with an anti-caking agent of the present invention, no bag got torn even after 2 months.

EXAMPLE 5

Polyvinyl acetate of a polymerization degree of 1,000 was solubilized with a 16 percent by weight aqueous solution of magnesium octylsulfate to form a clear solution of a solid content of 20 percent by weight. The solution was diluted with water to a solid content of 3 percent by weight and uniformly sprayed on ammonium sulfate in the amount of 0.05 percent calculated as the solids based on the weight of ammonium sulfate. The ammonium sulfate thus treated was dried to a moisture content of 0.01 percent and pulverized to 20 to 60 Tyler mesh. 30g. of the pulverized urea was molded into a tablet and was subjected to the determination of load at break in the same manner as in Example 1. The load at break was 0.9Kg. In case where no anti-caking agent was added, the load was 10.0Kg and in case the anti-caking agent obtained by solubilizing with magnesium dodecylsulfate in place of magnesium octylsulfate, the load was 1.9Kg.

The urea treated with an anti-caking agent consisting of polyvinyl acetate and magnesium octylsulfate or polyvinyl acetate and magnesium dodecylsulfate was packed in polyethylene bags formed of the same material with the test piece B in Example 3 and 20 bags thus filled with the urea were heaped up. In case of the bags filled with the urea treated with the polyvinyl acetate-magnesium octylsulfate in accordance with the present invention no bag got torn even after 3 months, while in case of the bags filled with the urea treated with the polyvinyl acetate-dodecylsulfate 9 bags got torn along the seal after 2 days.

What we claim is:

1. A method of preventing the caking of solid fertilizer particles which are apt to cake and of reducing the breakdown of polyethylene bags in which said fertilizers are packed, which comprises:

applying to said fertilizer an aqueous solution of an anti-caking agent obtained by dissolving (A) a substantially water-insoluble polymer selected from the group consisting of polyvinyl acetate, polyvinyl formal, polyvinyl acetoacetal, polyvinyl butyral, water-insoluble partial saponification products of polyvinyl acetate, substantially water-insoluble partial acetylated products of polyvinyl alcohol, graft copolymers of polyvinyl alcohol and vinyl acetate, copolymers of vinyl acetate with vinyl pyrrolidone, copolymers of vinyl acetate with maleic anhydride, methyl-, ethyl-, propyl- and butyl esters of polyacrylic acid, copolymers of ethyl acrylate with 2-ethylhexyl acrylate, copolymers of vinyl acetate with ethylene and copolymers of vinyl acetate with methyl-, ethyl-, propyl- or butyl acrylate, in (B) a concentrated aqueous solution of a solubilizing agent selected from the group consisting of the alkali metal salts and alkaline earth metal salts of (1) alkyl sulfates, α-olefin and sulfonates and alkylsulfonates containing 6 to 10 carbon atoms and (2) alkylbenzenesulfonates in which the alkyl radical contains four to eight carbon atoms, the weight ratio of said solubilizing agent to said polymer being in the range of 1:9 to 9:1, the combined amount of the polymer and the solubilizing agent applied to said fertilizer being in the range of 0.005 to 0.5 percent by weight of the fertilizer, drying the fertilizer and packing the fertilizer in polyethylene bags.

2. A method according to claim 1, wherein the fertilizer apt to cake is selected from the group consisting of urea, ammonium sulfate, ammonium nitrate, ammonium chloride and mixtures thereof.

3. A method according to claim 1, wherein the aqueous solution contains from 0.1 to 10 percent by weight of the anticaking agent.

* * * * *